(12) United States Patent
Van Den Homberg et al.

(10) Patent No.: US 7,535,815 B2
(45) Date of Patent: May 19, 2009

(54) DISC DRIVE APPARATUS

(75) Inventors: Johannes Aldegonda Theodora Maria Van Den Homberg, Eindhoven (NL); Albert Hendrik Jan Immink, Eindhoven (NL); Bart Michiel De Boer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 394 days.

(21) Appl. No.: 10/539,363

(22) PCT Filed: Dec. 2, 2003

(86) PCT No.: PCT/IB03/05667

§ 371 (c)(1),
(2), (4) Date: Jun. 15, 2005

(87) PCT Pub. No.: WO2004/005788

PCT Pub. Date: Jul. 8, 2004

(65) Prior Publication Data

US 2006/0209390 A1    Sep. 21, 2006

(30) Foreign Application Priority Data

Dec. 19, 2002  (EP) .................................. 02080382

(51) Int. Cl.
*G11B 7/00* (2006.01)
(52) U.S. Cl. ..................................... 369/121; 372/38.02
(58) Field of Classification Search .................. 369/121, 369/99; 372/38.02
See application file for complete search history.

(56) References Cited

U.S. PATENT DOCUMENTS

| 4,787,078 | A | * | 11/1988 | Yokogawa | 369/122 |
|---|---|---|---|---|---|
| 5,276,671 | A | * | 1/1994 | Minami et al. | 369/116 |
| 5,495,464 | A | * | 2/1996 | Fujikawa et al. | 369/121 |
| 5,748,657 | A | * | 5/1998 | Gaddis | 372/38.02 |
| 5,757,141 | A | * | 5/1998 | Wood | 315/224 |
| 5,796,767 | A | * | 8/1998 | Aizawa | 372/38.02 |
| 6,011,769 | A | * | 1/2000 | Takahara | 369/121 |
| 6,175,579 | B1 | * | 1/2001 | Sandford et al. | 372/32 |
| 6,489,600 | B1 | * | 12/2002 | Taguchi | 250/205 |
| 6,859,624 | B1 | * | 2/2005 | Kuo et al. | 398/182 |
| 2003/0002550 | A1 | * | 1/2003 | Schemmann et al. | 372/38.02 |
| 2003/0043611 | A1 | * | 3/2003 | Bockle et al. | 363/131 |
| 2003/0043869 | A1 | * | 3/2003 | Vaughan | 372/38.02 |

FOREIGN PATENT DOCUMENTS

| DE | 4010149 A1 | 10/1991 |
|---|---|---|
| EP | 0645766 A1 | 3/1995 |
| EP | 0918322 A1 | 5/1999 |
| EP | 918322 A1 * | 5/1999 |
| EP | 1261084 A2 | 11/2002 |
| JP | 06132590 A | 5/1994 |
| JP | 2001267694 A | 9/2001 |

OTHER PUBLICATIONS

ISR Publication, International Publication No. WO2004/057588A1.

* cited by examiner

*Primary Examiner*—Wayne R Young
*Assistant Examiner*—Thomas D Alunkal

(57) ABSTRACT

An optical disc drive apparatus includes a laser device for generating a light beam for optically reading data from a disc. The laser device is electrically incorporated in a resonant circuit which includes an inductance coupled to the laser device.

17 Claims, 7 Drawing Sheets

DISC DRIVE APPARATUS

The present invention relates in general to an optical disc drive apparatus for reading information from an optical storage disc.

As is commonly known, an optical storage disc comprises at least one track, either in the form of a continuous spiral or in the form of multiple concentric circles, of storage space where information may be stored in the form of a data pattern. Optical discs may be read-only type, where information is recorded during manufacturing, which data can only be read by a user. The optical storage disc may also be a writable type, where information may be stored by a user. Typical examples of optical discs are, for instance, CD, DVD.

For reading information from the storage space of the optical storage disc, an optical disc drive comprises, on the one hand, rotating means for receiving and rotating an optical disc, and on the other hand optical means for scanning the storage track with an optical beam. Since the technology of optical discs in general, the way in which information can be stored in an optical disc, and the way in which optical data can be read from an optical disc, is commonly known, it is not necessary here to describe this technology in more detail.

Said optical scanning means comprise a light beam generator device (typically a laser diode), an optical detector for receiving the reflected light reflected from the disc and for generating an electrical detector output signal, means for directing light from the generator towards the disc, and means for directing reflected light from the disc towards the detector. The reflected light is modulated according to the data pattern of the track under scan, which modulation translates into modulation of the electrical detector output signal.

Figure 1:
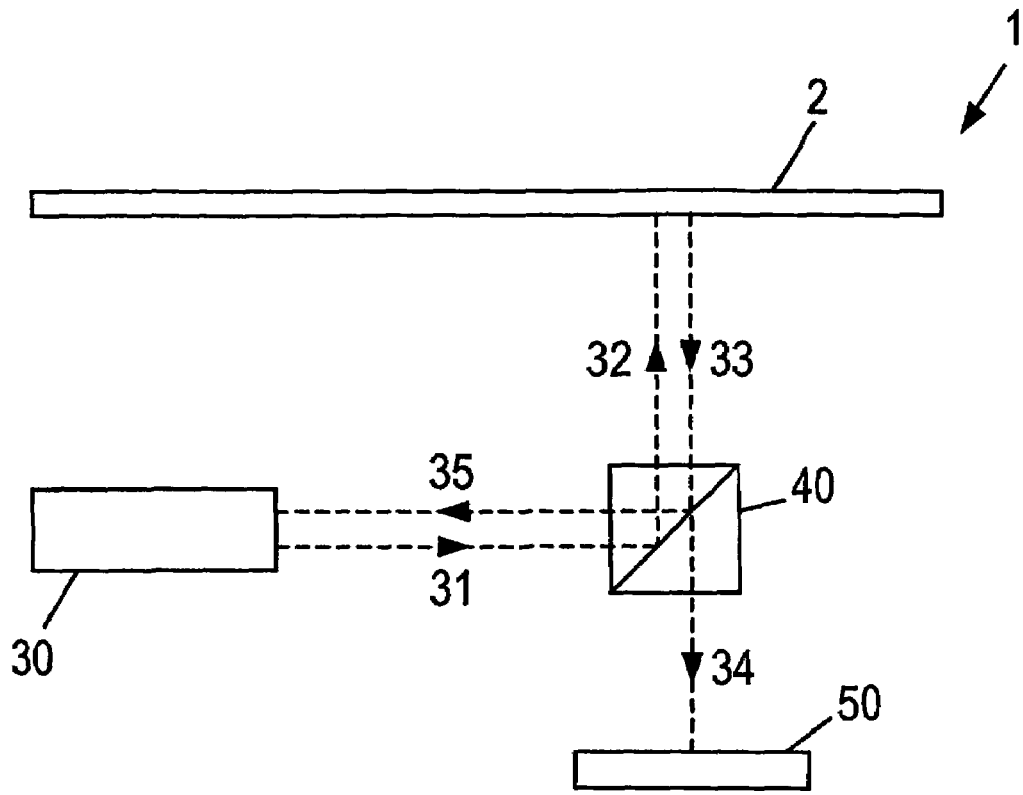

Usually, said directing means comprise a beam splitter. FIG. 1 schematically illustrates an optical path in an optical disc drive 1. A laser 30 generates a light beam 31, which is reflected over 90° by a beam splitter 40 (beam 32), reflects from the disc 2 (reflected beam 33), and passes the beam splitter 40 towards a detector 50 (passing beam 34). Alternatively, the layout may be such that the optical path is straight from laser to disc and makes an angle of 90° from disc towards detector.

A problem is that part of the reflected beam 33 does not follow the intended path towards the detector 50 but is reflected back by the beam splitter 40 towards the laser 30 (feedback beam 35), and will influence the operation of the laser 30 itself. This phenomenon, which is known per se, is indicated as Optical Feedback Noise (OFN). OFN causes a deterioration of the signal-to-noise ratio (SNR).

In the art, OFN is suppressed by switching the laser ON and OFF at a very high switching frequency, which is called "read-modulation". The switching frequency, also called "modulation frequency", is selected well above the frequency range of the bandwidth of the data channel, in order to avoid interference with the data signal. In practice, a modulation frequency in the order of 300-500 MHz is common.

A practical problem in this respect is the fact that the laser has a relatively large parasitic capacitance. A relatively large portion of the modulation current will flow in this capacitance instead of generating light. This portion, which will be called "blind current", does not contribute to the output light power, but does cause losses in the internal resistance of a driver producing the modulation current.

According to an important aspect of the present invention, this problem is overcome or at least reduced by incorporating the laser capacitance in an LC oscillator circuit. In that case, the capacitive part of the modulation current can be provided substantially by cyclic current in the oscillator circuit, so that energy is substantially preserved in the oscillator circuit instead of being dissipated.

Figure 2:
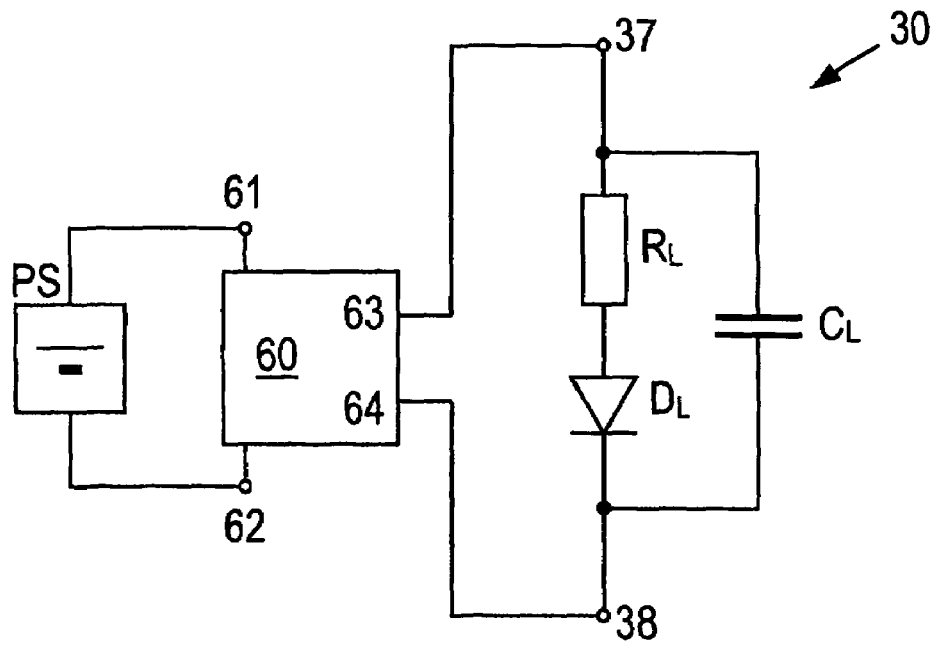
Figure 3A:
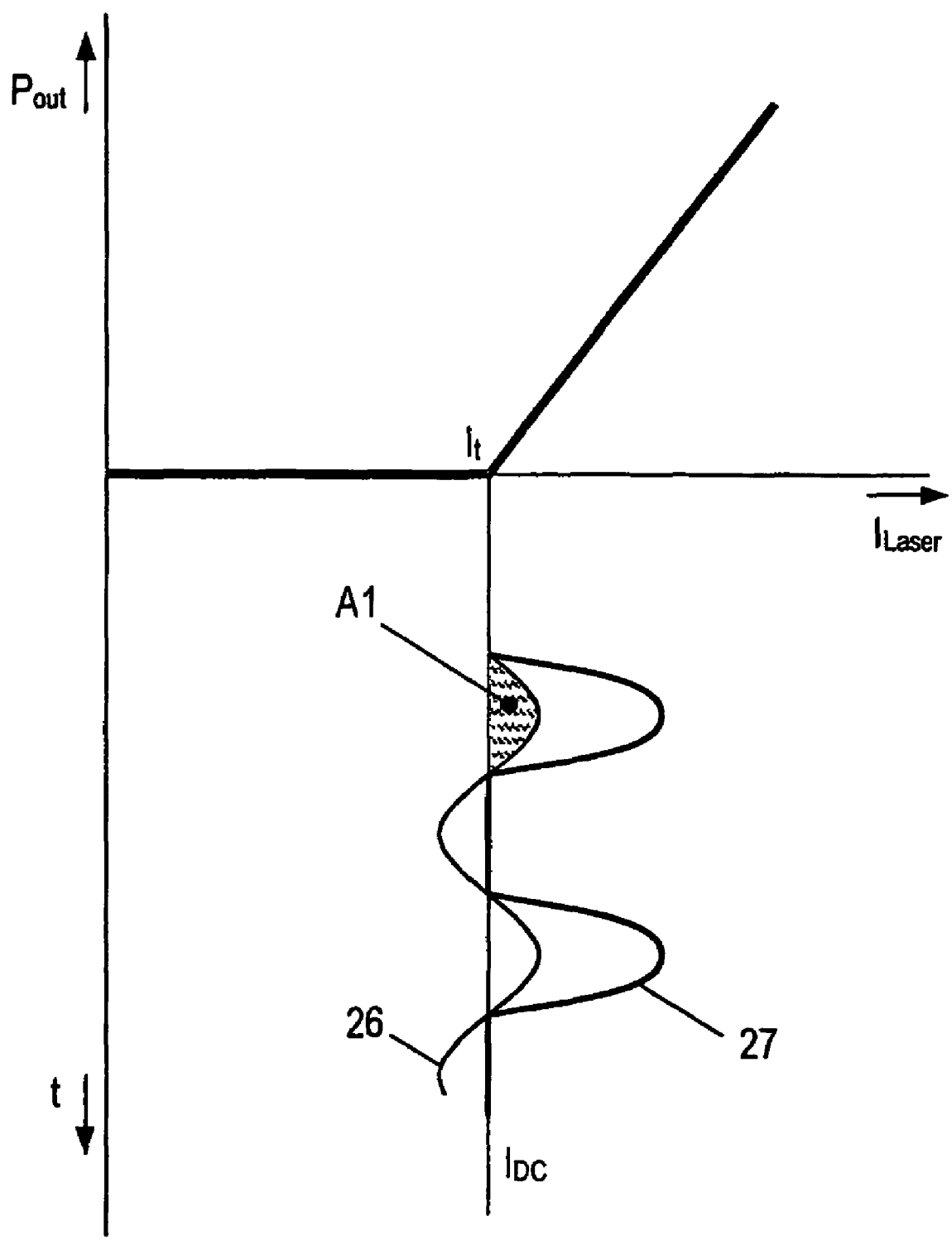
Figure 3B:
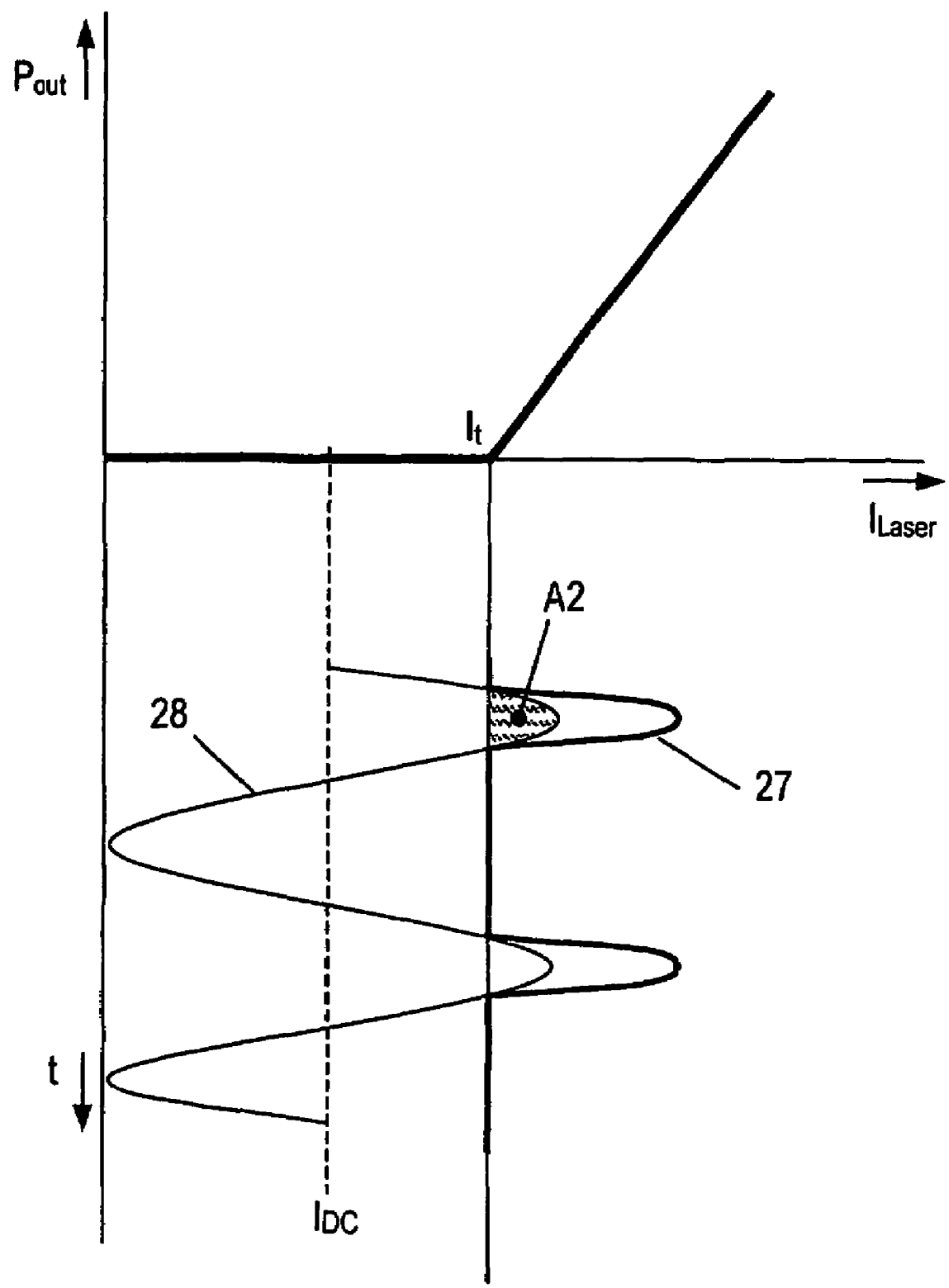
Figure 4:
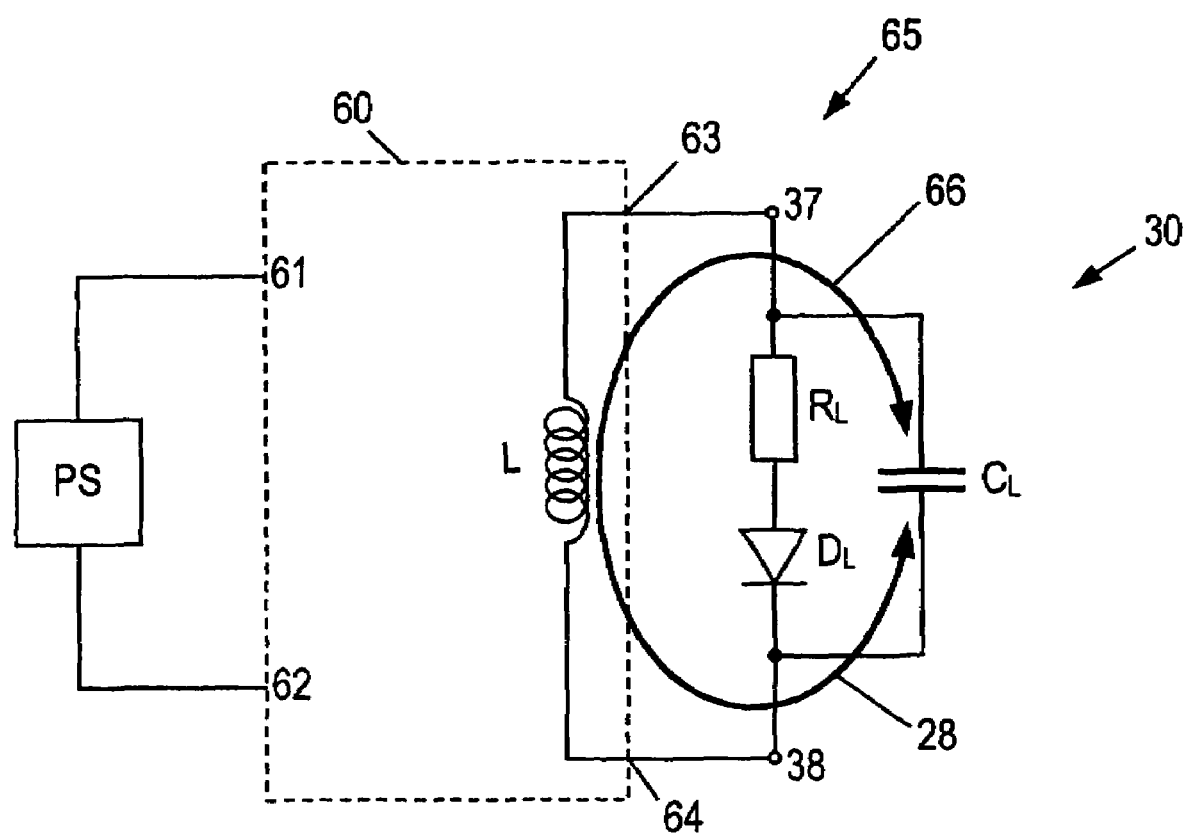

These and other aspects, features and advantages of the present invention will be further explained by the following description of exemplary embodiments of a laser driver circuit according to the present invention with reference to the drawings, in which same reference numerals indicate same or similar parts, and in which:

FIG. 1 schematically illustrates components of a disc drive in order to illustrate the feedback noise problem;

FIG. 2 shows an electrical replacement diagram of a laser diode and a driver circuit;

FIGS. 3A-B are graphs illustrating electrical characteristic of a laser diode device;

FIG. 4 is an electrical diagram illustrating a basic feature of the present invention; and FIGS. 5-8 are electrical diagrams illustrating different preferred embodiments of a driver circuit.

For illustrating the electrical behavior of laser diodes, FIG. 2 shows a replacement diagram of a laser diode device 30, coupled to a driver circuit 60. Electrically, the laser diode device 30 behaves as a series combination of a (substantially ideal) diode $D_L$ with a differential resistance $R_L$, and a parasitic capacitance $C_L$ connected in parallel to said series combination. The laser device 30 has two terminals for electrical connection, indicated as anode terminal 37 and cathode terminal 38.

The driver circuit 60 has supply terminals 61 and 62 for connection to a power supply PS. The driver circuit 60 has output terminals 63 and 64 connected to the anode terminal 37 and cathode terminal 38 of the laser diode device 30, respectively. Generally speaking, when the voltage at anode terminal 37 is sufficiently higher than the voltage at cathode terminal 38, a current will flow through the laser diode device 30 and laser light 31 will be generated.

FIG. 3A is a graph schematically illustrating a laser characteristic of light output power $P_{OUT}$ (vertical axis upwards) versus laser current $I_{laser}$ (horizontal axis). Below a threshold current $I_t$, typically in the order of about 40 mA, the laser diode produces hardly or no light. If the laser current is even a few mA above the threshold current, the laser diode generates sufficient light for use in reading an optical disc.

FIG. 3A also shows a conventional mode of modulating the laser 30, wherein the laser is operated with a drive current comprising a DC current component $I_{DC}$ at a level substantially equal to the threshold current $I_t$ and an AC current component having the required modulation frequency and just a small magnitude, sufficient to suppress light generation in the current troughs and to permit light generation in the current crests. Curve 26 illustrates such drive current (horizontal axis) as a function of time (vertical axis downwards); curve 27 illustrates the corresponding light signal generated (horizontal axis) as a function of time (vertical axis downwards). The duty cycle of this light signal is shown as being substantially equal to 50%.

In such operative mode, however, the constantly flowing DC current at level $I_t$ will cause a significant power consumption.

FIG. 3B is a graph similar to FIG. 3A, but now illustrating a different operative mode. The drive current 28 now has a DC current component $I_{DC}$ at a level substantially lower than the threshold current $I_t$. The AC current component has a correspondingly higher amplitude, so that the current crests extend to above the threshold current $I_t$. The overall light output power will be substantially equal as compared to the mode illustrated in FIG. 3A if the area of the surface below the current crest and above the threshold current $I_t$ (hatched surface A2) is the same as in FIG. 3A (hatched surface A1). At the same time, the lowest value of the current (deepest point of the troughs) has a substantially reduced current value, and can be equal to zero (modulation depth of 100%) when the DC current component $I_{DC}$ is at approximately 50% of the threshold current $I_t$. Then, the average current is reduced by half as compared to the mode illustrated in FIG. 3A. However, in this case a relatively large capacitive current is generated in the parasitic capacitance $C_L$ of the laser diode.

Further, conventional drivers have a resistive characteristic, in which case this mode is relatively inefficient due to inductive and capacitive losses in the current path to the laser. As a consequence, conventional drivers are not capable of feeding the laser 30 with voltage and current at levels higher than received from the power supply PS.

FIG. 4 illustrates the basic principle underlying the present invention. The driver circuit 60 comprises an inductance L, preferably implemented as a coil, incorporated in a current path between its output terminals 63 and 64, so that, in use, when a laser diode device 30 is connected to the output terminals 63 and 64 of the driver circuit 60, said inductance L and the parasitic capacitance $C_L$ of the laser diode device 30 form part of a current path in which electrical energy can be exchanged in a resonant manner from inductance L to capacitance $C_L$ and vice versa. Thus, the inductance L and the parasitic capacitance $C_L$ are energy-exchanging components in an oscillator circuit 65. For sake of simplicity, other components of the driver circuit 60, for feeding power to said circuit 65, are not shown in FIG. 4. Further, the oscillator circuit 65 comprises at least one DC-blocking capacitor in series with the inductance L, which DC-blocking capacitors are also not shown for sake of simplicity.

Once excited, the LC oscillator will continue to run, and a loop current 66 will flow back and forth, with only little losses, at a frequency determined by the total inductance and the total capacitance of the closed loop 65, as will be clear to a person skilled in the art.

Said loop current 66 constitutes the AC current component of the laser drive current, such as the current 28 of FIG. 3B. An important advantage of the LC oscillator circuit 65 is that electrical energy of this AC current component is substantially preserved within the circuit. Apart from possible other current components, the power supply PS needs only to compensate the AC energy lost in the loop. The current required to sustain the oscillator circuit 65 can be much lower than the amplitude of the AC current flowing in the loop (typically, with an AC current magnitude in the order of about 50-60 mA, the required feeding current can be lower than 10 mA), while also the magnitude of the voltage signal at the driver output terminals 63, 64 can be higher than the input voltage received from the power supply PS at the driver input terminals 61, 62; this is not possible with a conventional resistive driver.

However, the rectifying characteristic of the diode component of the laser makes it difficult to use a circuit as simple as the basic circuit of FIG. 4.

In the following, preferred embodiments of the driver circuit will be discussed with reference to FIGS. 5-7.

Figure 5:
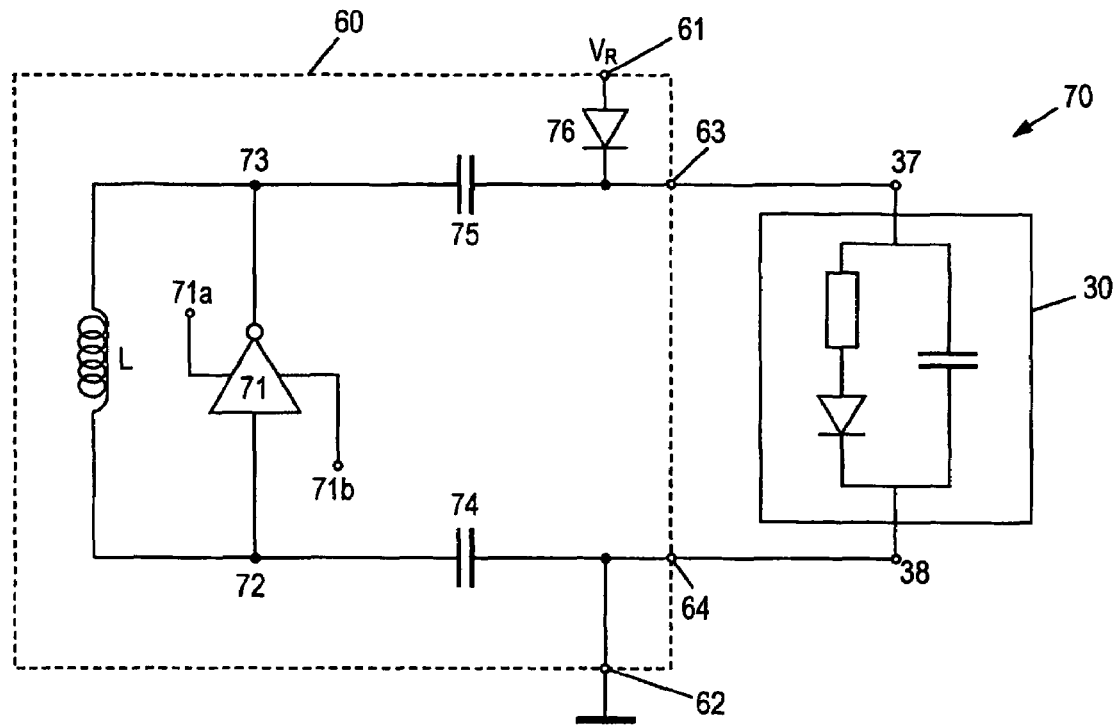

FIG. 5 illustrates a first preferred embodiment of a drive circuit 60 for the laser. This embodiment comprises a parallel combination of an inductor (coil) L and an inverter 71. A first capacitor 74 connects the input node 72 of the inverter 71 to a reference voltage (mass), for instance through second supply terminal 62. A second capacitor 75 connects the output node 73 of the inverter 71 (via first output terminal 63) to the anode terminal 37 of the laser device 30, whose cathode terminal 38 is connected (via second output terminal 64) to the same reference voltage (mass). Preferably, the two capacitors 74 and 75 have similar capacitance, more preferably equal capacitance. A bootstrap diode 76 connects the anode terminal 37 of the laser device 30 (via first output terminal 63) to a positive voltage reference $V_R$, for instance 3.3 V, for instance through first supply terminal 61. The inverter 71 may have power supply terminals 71a and/or 71b, connected to the power input terminals 61 and/or 62 of the driver 60 (these connections are omitted in FIG. 5 for sake of clarity). The inverter 71 can simply be implemented as a standard two-transistor inverter circuit.

The parasitic capacitance $C_L$, the inductance L, and the two load capacitors 74 and 75 in combination constitute an LC oscillator circuit 70. As will be clear to a person skilled in the art, the LC oscillator 70 in this embodiment is implemented as a Pierce oscillator. Since such oscillators are well-known, an elaborate discussion of its operation is not necessary here. Briefly summarized, the operation is as follows.

When the input node 72 of the inverter 71 is high while the output node 73 of the inverter 71 is low, the second load capacitor 75 is charged to almost the positive voltage reference $V_R$ via the bootstrap diode 76. The laser device 30 is off, since the anode voltage at anode terminal 37 is lower than the laser threshold voltage (about 4 V).

At a certain moment, the voltage at the input node 72 of the inverter 71 has decreased sufficiently so that the output node 73 of the inverter 71 turns high. Then, the voltage at the anode terminal 37 of the laser device 30 will be the inverter output voltage plus the voltage over the second load capacitor 75, which is almost the positive voltage reference $V_R$. In an exemplary embodiment, where the said positive voltage reference $V_R$ is also supply voltage for the inverter 71, this supply voltage being 3.3 V for example, the voltage at the anode terminal 37 of the laser device 30 will be approximately 6 V, much higher than the 4 V threshold level of the laser.

The supply voltage $V_R$, in combination with any voltage drop over the bootstrap diode 76, is selected to result in a DC voltage at the anode terminal 37 of the laser device 30 just below the threshold level of the laser device 30. During the half period when the output node 73 of the inverter 71 is high, the diode 76 is in a blocking condition and the power supply (see FIG. 4) provides no current other than a bias current for the oscillator circuit 70. Current will now flow from the second load capacitor 75 through the laser device 30, charging the parasitic capacity $C_L$ of the laser device 30.

During the half period when the output node 73 of the inverter 71 is low, the laser device 30 is off. The second load capacitor 75 is charged from the parasitic capacity $C_L$ of the laser device 30 and from the positive power supply through diode 76, as described above. The amount of current now provided by the positive power supply corresponds substantially to the amount of energy dissipated in the laser device 30, i.e. the DC part of the laser current. The relatively large AC current is substantially preserved in the LC oscillator circuit 70 established by the parasitic capacitance $C_L$, the inductance L, and the two load capacitors 74 and 75. This allows large modulation depth which in turn saves DC current in the laser device 30.

It is noted that the oscillation frequency $\omega$ of the oscillator circuit 70 is determined by the overall inductance $L_T$ of the current loop and the overall capacity $C_T$ of the current loop, according to the formula $\omega=1/\sqrt{(L_T C_T)}$.

It is further noted that the quality factor Q of the oscillator circuit 70 is determined by the overall inductance $L_T$ of the current loop and the overall capacity $C_T$ of the current loop, according to the formula $Q=1/R_S \cdot \sqrt{(L_T/C_T)}$, wherein $R_S$ represents the equivalent series resistance of the current loop.

It is further noted that increasing the capacitance of the load capacitors 74 and 75 will reduce the overall capacity $C_T$ of the current loop, and that increasing the inductivity of the coil L will increase the overall inductance $L_T$ of the current loop, so that it is possible to select suitable values in order to obtain a desirable frequency and a desirable quality factor Q.

Figure 6:
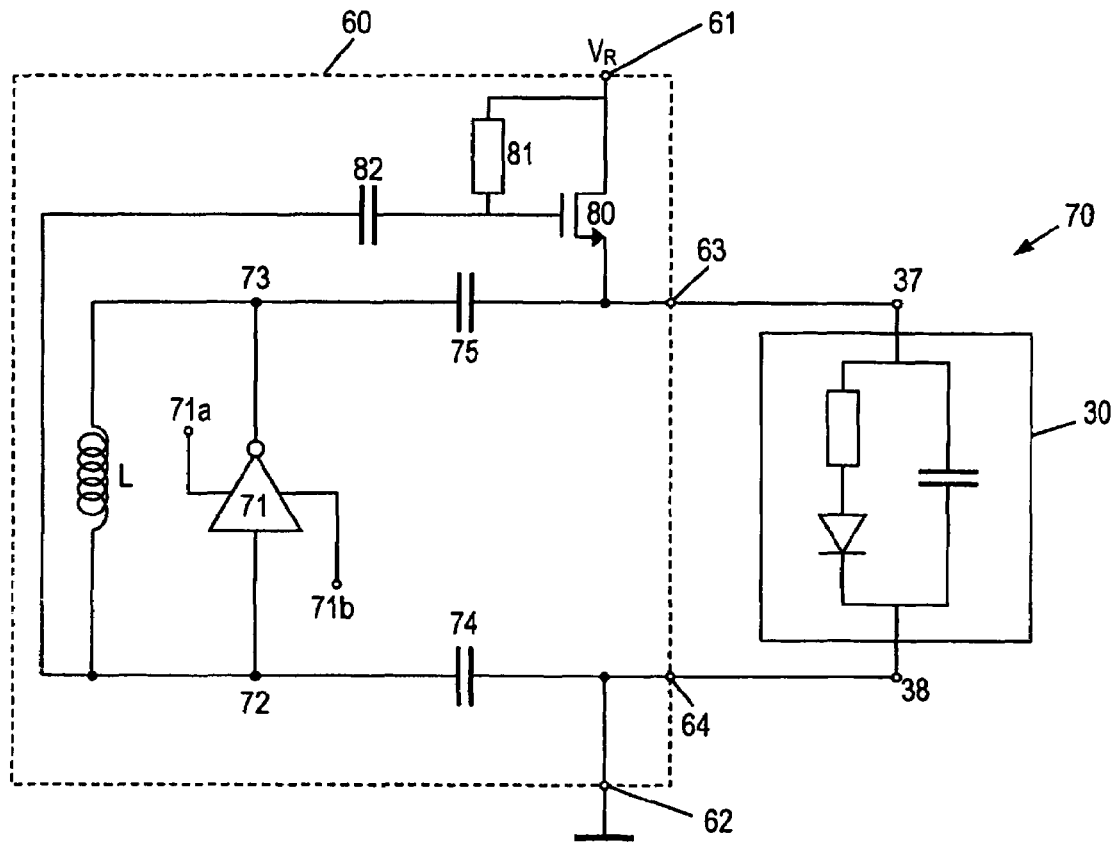

FIG. 6 illustrates a second preferred embodiment of a drive circuit 60 for the laser device 30. This circuit is similar to the circuit discussed above with reference to FIG. 5, with the bootstrap diode now being replaced by a controllable switch 80 which is controlled by the voltage at a suitable one of the nodes in the oscillator 70. An advantage of such switch 80 over the bootstrap diode 76 is that the loss caused by the voltage drop over the diode can be reduced or even eliminated, even at very high oscillation frequencies.

In FIG. 6, this switch 80 is implemented as an NMOS FET having its source connected to the anode terminal 37 of the laser device 30 and having its drain connected to the positive voltage reference $V_R$. A bias resistor 81 connects the gate of the FET to its drain. A capacitor 82 connects the gate of the FET to the input node 72 of the inverter 71. Through this capacitor 82, the gate of the FET follows the voltage swing of the input node 72 of the inverter 71. When the output node 73 of the inverter 71 is low, its input node 72 is high, hence the voltage at the gate of the FET 80 is high to drive the FET open so that the second capacitor 75 is charged practically without losses through the low-ohmic drain-source path of the FET 80.

It should be clear to a person skilled in the art that the present invention is not limited to the exemplary embodiments discussed above, but that various variations and modifications are possible within the protective scope of the invention as defined in the appending claims.

For instance, the oscillator does not necessarily have to be of the Pierce type illustrated in FIGS. 5 and 6: in principle, any type of oscillator can be used. By way of alternative example, the oscillator may be implemented as a Colpitts oscillator, a Hartley oscillator, etc.

Figure 7A:
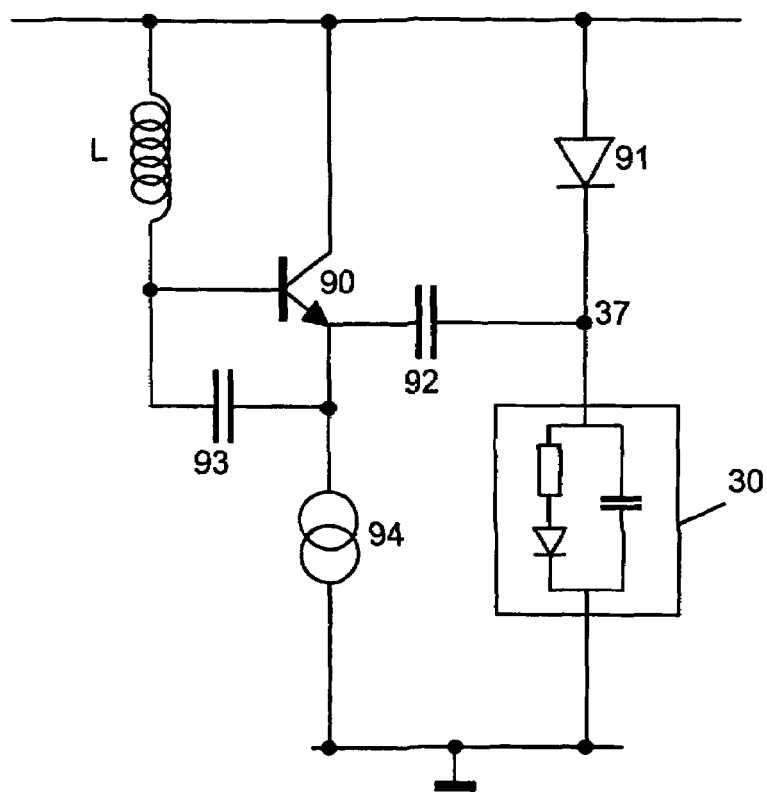
Figure 7B:
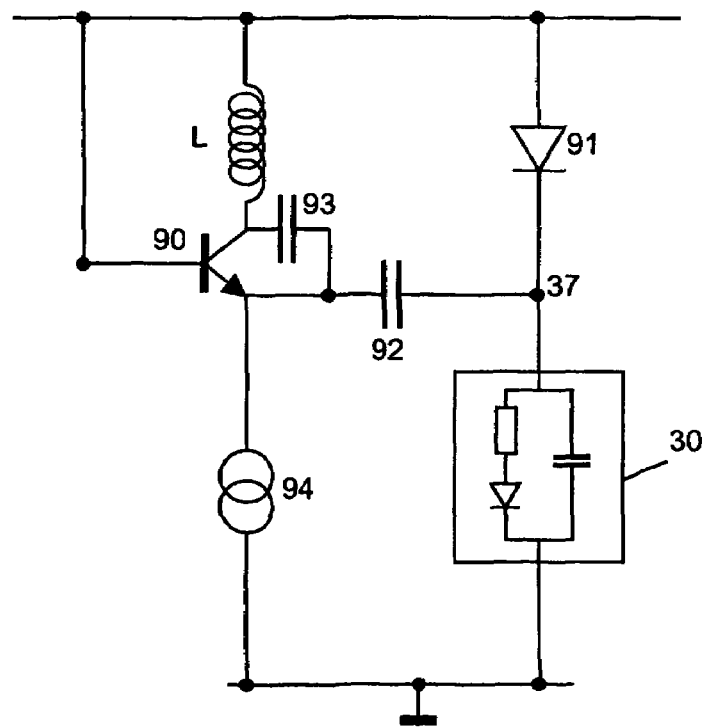

FIGS. 7A-B illustrate embodiments based on a Colpitts oscillator. The embodiment of FIG. 7A is a common collector embodiment, comprising an NPN transistor 90 having its emitter connected to laser terminal 37 through a first coupling capacitor 92. 91 represents a bootstrap diode, comparable to diode 76. A second coupling capacitor 93 is connected between base and emitter of the transistor 90. The inductor L is connected between base and collector of the transistor 90. A current source 94 is coupled to the emitter of the transistor 90. A positive voltage source is connected to the collector of the transistor 90.

The embodiment of FIG. 7B is a common base embodiment. In this case, the positive voltage source is connected to the base of the transistor 90; the second coupling capacitor 93 is connected between collector and emitter of the transistor 90; and the inductor L is connected between the collector of the transistor 90 and the positive voltage source.

Since Colpitts oscillators are known per se, a description of the operation of the embodiments of FIGS. 7A-B is omitted here.

Figure 8:
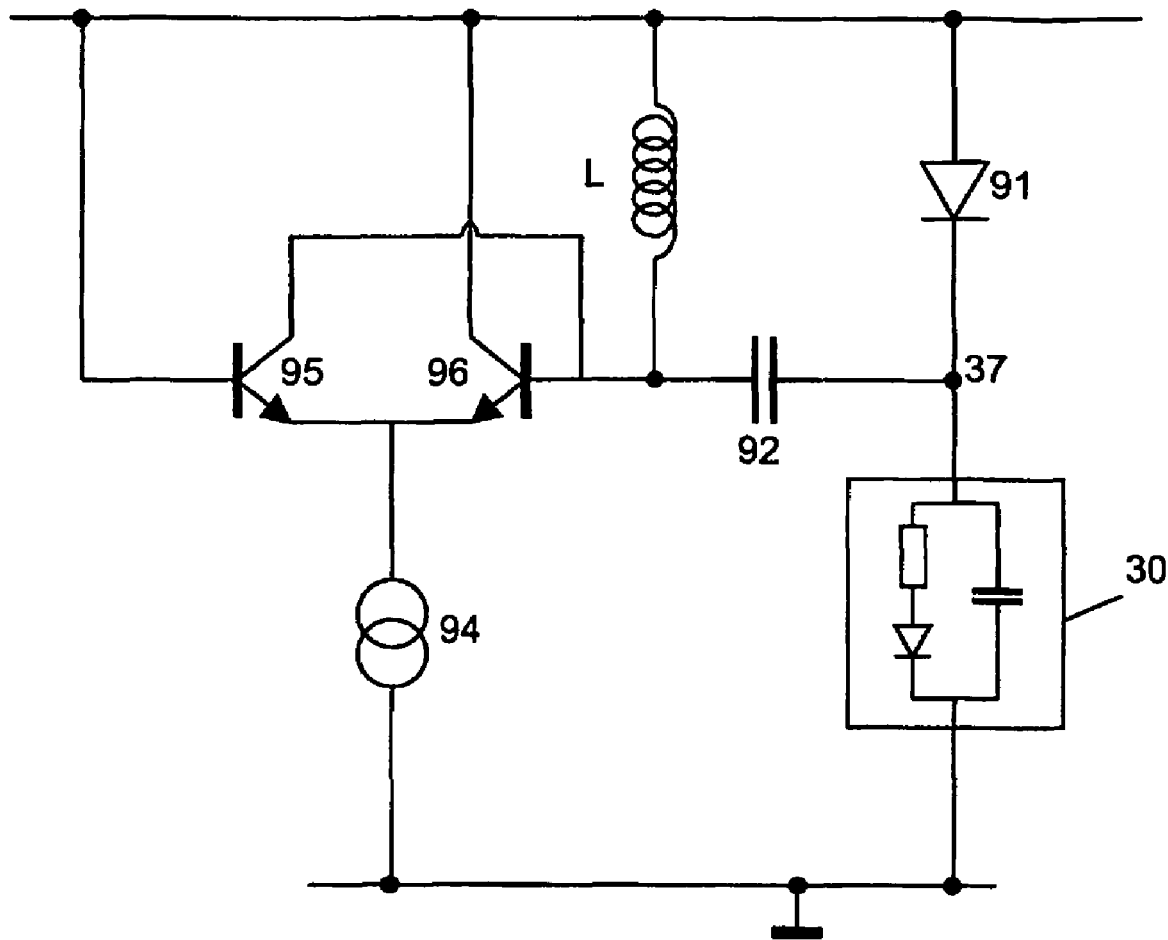

FIG. 8 illustrates an embodiment based on the "undamping" principle. The configuration of the two transistors 95, 96 having their emitters connected together constitutes a differential amplifier, having an inverting output (collector of transistor 95) connected to its own non-inverting input (base of transistor 96). This is positive feedback. At the node of the output and input, a negative differential resistance is seen, which is connected in parallel to the oscillator loop, effectively compensating the resistive losses in the loop; i.e. "undamping".

The invention claimed is:

1. An optical disc drive apparatus, comprising a laser device for generating a light beam for optically reading data from a disc, said laser device being incorporated in an LC oscillator circuit, with a parasitic capacitance of said laser resonating with an inductor to form a resonant LC circuit of said LC oscillator circuit, so that electrical energy can be exchanged in a resonant manner between the inductor and the parasitic capacitance back and forth, wherein an inverter is coupled in parallel to the inductor.

2. The optical disc drive apparatus according to claim 1, wherein said LC oscillator circuit comprises a current path in which said laser device and an inductance are coupled in a series arrangement.

3. The optical disc drive apparatus according to claim 1, wherein said LC oscillator circuit comprises at least one capacitance coupled in series with said laser device and said inductance.

4. A laser driver circuit for driving a semiconductor laser, having a first output terminal and a second output terminal for connection to an anode terminal and a cathode terminal, respectively, of a laser to be driven;
the laser driver circuit comprising an inductance having at least one terminal coupled to at least one of said output terminals, and a parasitic capacitance of said laser resonating with said inductance to form a resonant LC circuit of an LC oscillator circuit, so that electrical energy can be exchanged in a resonant manner between said inductance and the parasitic capacitance back and forth, wherein an inverter is coupled in parallel to said inductance.

5. The laser driver circuit according to claim 4, further comprising at least one capacitance coupled between said inductance and said first or second output terminal, respectively.

6. The laser driver circuit according to claim 4, wherein said inductance has one terminal coupled to said first output terminal and has another terminal coupled to said second output terminal.

7. The laser driver circuit according to claim 4, further comprising a diode coupled between one of said output terminals and a voltage reference.

8. The laser driver circuit according to claim 7, wherein said diode comprises a controllable switch controlled by a signal derived from a voltage occurring at a location in a current path defined by said inductance and said output terminals, said location corresponding to one terminal or a tap of said inductance.

9. The laser driver circuit according to claim 4, comprising an output stage implemented as an oscillator coupled to at least one of said output terminals.

10. A light beam generating device, comprising a semiconductor laser driven by laser driver circuit according to claim 4.

11. An optical disc drive apparatus, comprising a laser driver circuit according to claim 4.

12. The optical disc drive apparatus of claim 1, wherein the inductor and capacitor are connected in parallel.

13. The laser driver circuit of claim 4, wherein said inductance and said parasitic capacitor are connected in parallel.

14. The laser driver circuit of claim 4, further comprising:
a first capacitor connected between a first terminal of said inductance and the anode terminal; and
a second capacitor connected between a second terminal of the inductor and the cathode terminal.

15. The laser driver circuit of claim 14, further comprising a switch connected between the anode terminal and a reference voltage source.

16. The laser driver circuit of claim 15, wherein the switch is a bootstrap diode.

17. The laser driver circuit of claim 15, wherein the switch is a transistor.

* * * * *